United States Patent [19]

Funston

[11] Patent Number: 4,783,704
[45] Date of Patent: Nov. 8, 1988

[54] SKIP-FIELD VIDEO RECORDER WITH HIGH TEMPORAL SAMPLING RATE

[75] Inventor: David L. Funston, Batavia, N.Y.

[73] Assignee: Eastman Kodak Company, Rochester, N.Y.

[21] Appl. No.: 940,135

[22] Filed: Dec. 10, 1986

[51] Int. Cl.⁴ .................... H04N 5/78; H04N 5/91
[52] U.S. Cl. ........................... 360/11.1; 358/313; 358/335
[58] Field of Search ............ 360/9.1, 11.1, 33.1, 360/10.1; 358/313, 335

[56] References Cited

U.S. PATENT DOCUMENTS 3,837,003  9/1974  Justice .................. 358/313
4,133,009  1/1979  Kittler et al. ........... 360/11.1 X Primary Examiner—Aristotelis M. Psitos
Attorney, Agent, or Firm—Robert M. Wallace

[57] ABSTRACT

The skip-field video recorder of the invention maintains the temporal sampling rate of the original incoming video signal by including information from both the odd and even video fields of each frame in a single composite recorded video field. During playback, an odd and an even video field are synthesized from the single composite recorded video field to generate a complete video frame.

15 Claims, 3 Drawing Sheets

SKIP-FIELD VIDEO RECORDER WITH HIGH TEMPORAL SAMPLING RATE

BACKGROUND OF THE INVENTION

1. Technical Field

The invention is related to skip-field video recorders wherein only alternate fields of an incoming video signal are recorded so as to reduce by a factor of two the amount of video tape required to record a given video program. More specifically, the invention is related to a skip-field video recorder particularly adept at recording images containing high-speed motion without creating objectionable artifacts in the playback video image.

2. Discussion Related to the Problem

Skip-field video recording is a technique well-known in the art, and is described, for example in U.S. Pat. Nos. 3,886,589, 3,882,539 and U.S. patent application Ser. No. 908,750, filed Sept. 18, 1986 by Hans-Peter Baumeister et al. and entitled "ZERO GUARD-BAND SKIP-FIELD VIDEO CASSETTE RECORDER" and in prior patents referred to in the Baumeister et al. patent application.

In typical skip-field video recorders of the prior art, only one video field of each video frame of the incoming video signal is recorded (for example, only the even field, or, only the odd field). Accordingly, the vertical sampling rate (image quality of objects moving in the field of view across horizontal video lines) is reduced by a factor of two. For very rapid motion, objectional artifacts may be visible in a playback image created from a skip-field video recording. This is particularly true of NTSC skip-field video recording of motion pictures, where the conversion from 24 frames per second to 30 frames per second is liable to create some odd artifacts under special conditions.

It would seem the only way to eliminate such problems would be to abandon the skip-field video recorder technique whenever it is desired to obtain high quality recording of video programs containing high-speed motion in the image. The disadvantage is that the amount of tape required to record a given program is doubled by abandoning the skip-field recording technique. Thus, there is a trade-off between recorded image quality and tape speed. The problem is how to perform skip-field video recording of high-speed images without increasing the risk of high-speed motion artifacts in the playback video image.

SUMMARY OF THE INVENTION

The present invention skip-field records images containing high-speed motion while maintaining the vertical sampling rate of the original signal, so as to avoid introducing objectionable artifacts into the playback video image.

Solution to the Problem

Alternate horizontal video lines of an incoming odd video field are recorded as the alternate horizontal lines of a recorded video field. Likewise, alternate horizontal lines of the incoming even video field are recorded as the remaining horizontal video lines of the same recorded video field. Thus, alternate lines of both the odd and even video fields of each frame are recorded in a single composite field.

During playback, the invention synthesizes a playback odd field from the recorded odd field horizontal video lines, and synthesizes a playback even field from the recorded even field horizontal video lines. The missing horizontal lines of each synthesized playback field are filled in by interpolation. For example, alternate horizontal video lines of a synthesized odd field correspond exactly to a those of an original incoming odd field, while the remaining horizontal lines are interpolations between the odd field alternate horizontal lines. Likewise, alternate horizontal video lines of each synthesized even video field correspond exactly to those of an original incoming even field, while the remaining horizontal lines are interpolations between the even field alternate horizontal lines. The synthesized odd and even video fields are interlaced to form a synthesized playback video frame. This synthesized playback video frame has the same temporal sampling rate (but only half the vertical resolution) of the original incoming video signal. The advantage is that the playback video signal of the skip-field video recorder of this invention is as free of high-speed motion artifacts as is the original incoming video signal. Thus solves the problem of high-speed motion artifacts in skip-field video recording. Accordingly, the invention represents a significant advance in the art.

BRIEF DESCRIPTION OF THE DRAWINGS

The invention may be understood by reference to the accompanying drawings, of which.

DETAILED DESCRIPTION OF THE PREFERRED EMBODIMENT

Figure 1:
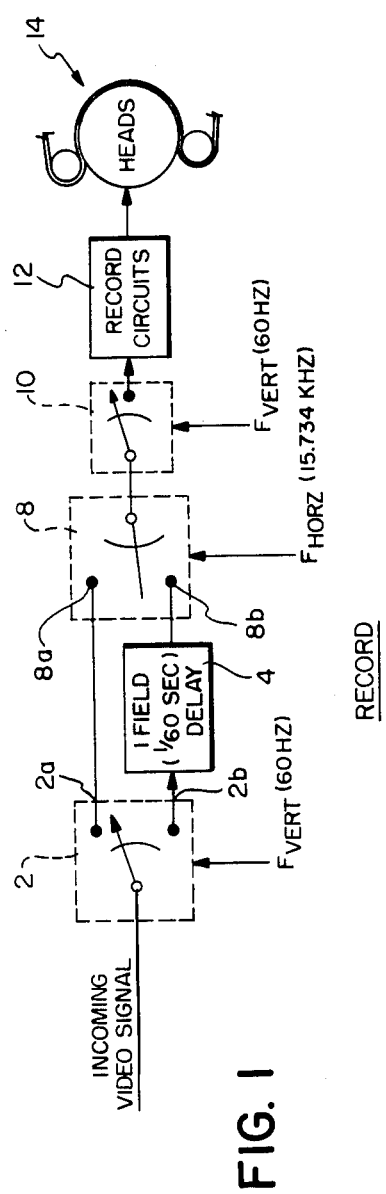
FIG. 1 is a block diagram of the preferred embodiment of the invention configured in the record mode.
Figure 2:
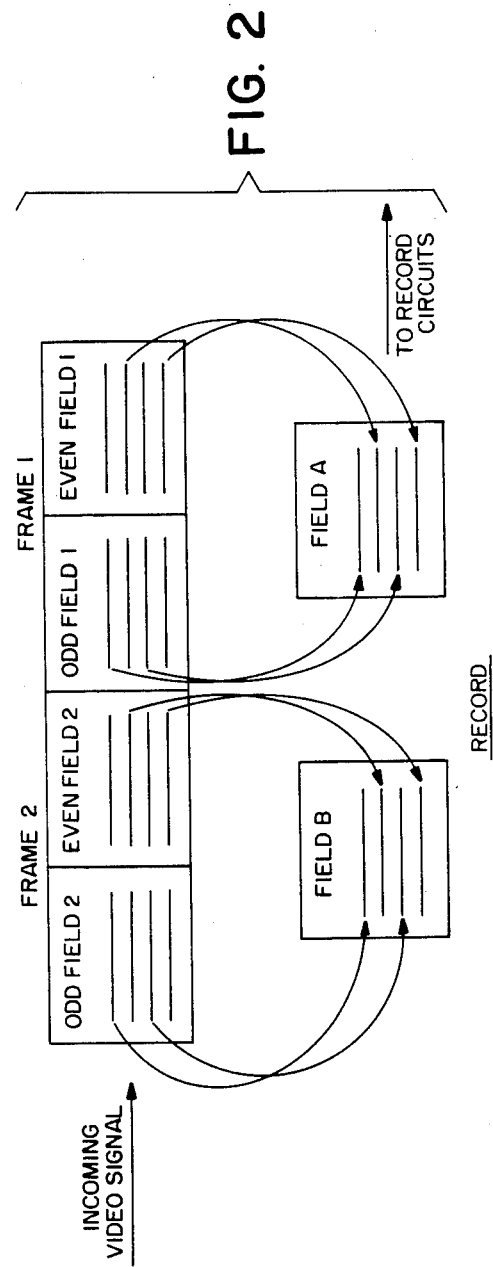
FIG. 2 is a diagram illustrating the recording operation of the embodiment of FIG. 1.

The information contained in both the odd and even fields of each frame of an incoming video signal is used by the embodiment of FIG. 1 to construct a single composite video field to be recorded. Thus, only a single field is recorded for each incoming video frame. Referring to FIG. 2, the alternate horizontal lines of incoming odd field 1 are the alternate horizontal lines of recorded field A. The alternate horizontal lines of incoming even field 1 are the remaining horizontal lines of recorded field A. Field B is reconstructed from frame 2 of the incoming video signal in the same manner.

Referring again to FIG. 1, a switch 2 applies the incoming video signal to one of two output terminals 2a, 2b. The switch 2 operates at the vertical or field frequency $F_{vert}$ (60 Hz for NTSC video systems) so that it switches between its two terminals 2a, 2b at the end of each video field. The terminal 2b is applied to a field delay 4 (which is a delay of 1/60 sec. for an NTSC system). The output of the field delay 4 and the switch terminal 2a are connected to input terminals 8a, 8b, respectively, of a second switch 8. The second switch 8 switches between its two terminals 8a, 8b at the horizontal line frequency $F_{horiz}$ (which is about 15.734 kHz in an NTSC system). The output of the second switch 8 is applied to the input of a third switch 10 operating at the field frequency $F_{vert}$. The output of the third switch 10 is applied to record circuits 12 of the type well-known in the art, which are connected to the heads of a video recording system 14 of the type well-known in the art.

The first switch 2 directs each odd field to the terminal 6a and each even field to the field delay 4. Simultaneously, the field delay 4 directs the previous even video field to the other terminal 6b. The second switch 8 alternately selects horizontal lines from the present (odd) and the previous (even) video field of the incoming video signal (from the terminals 8a or 8b, respectively) to produce a composite video field from each pair of incoming odd and even video fields. The third switch 10 transmits only alternate ones of the video fields generated by the switch 8. (This produces the "skip" field effect.) The input to the switch 2 is characterized by the full-frame incoming video signal of FIG. 2 while the output of the switch 10 is characterized by the composite video fields, field A, field B, etc. of FIG. 2.

Figure 3:
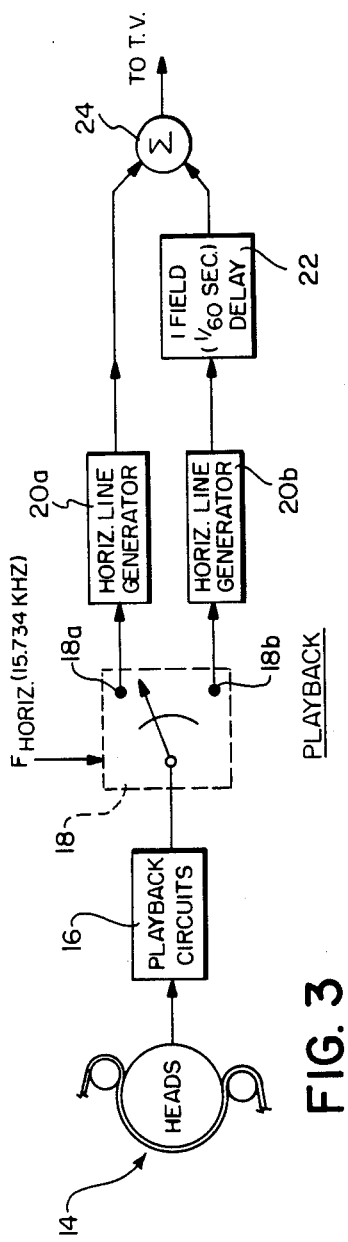
FIG. 3 is a diagram of the preferred embodiment of the invention configured in the playback mode.
Figure 4:
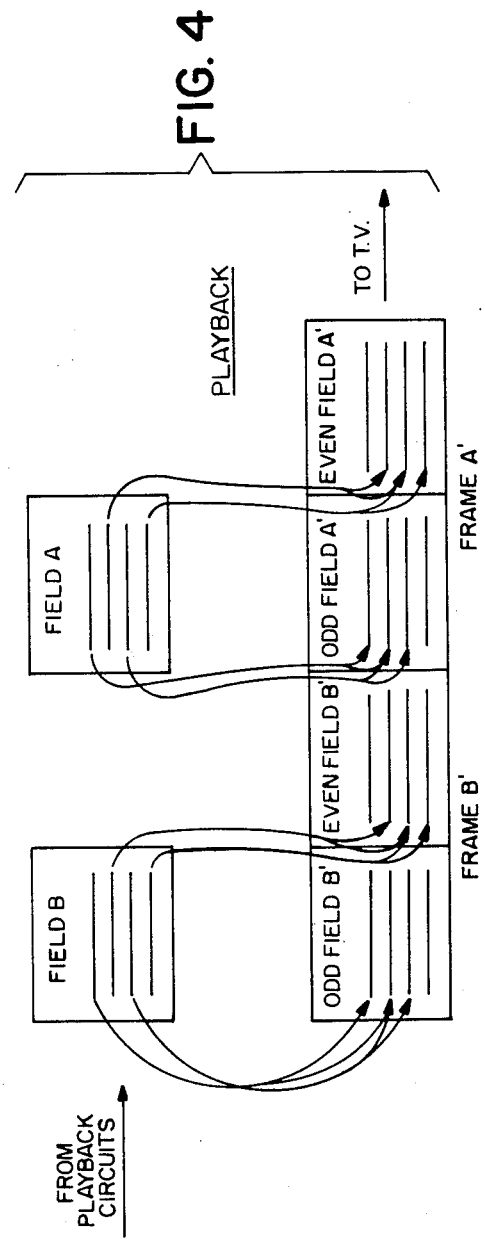
FIG. 4 is a diagram illustrating the playback operation of the embodiment of FIG. 3.

FIG. 3 is a diagram illustrating the skip-field video recorder of the invention configured in the playback mode. Playback operation of the embodiment of FIG. 3 is illustrated in FIG. 4. Referring to FIG. 4, during playback the embodiment of FIG. 3 synthesizes an odd and an even video field (odd field A' and even field A') from each recorded video field (field A) recorded by the embodiment of FIG. 1. As indicated in FIG. 4, alternate horizontal lines of odd field A' constitute the odd field horizontal lines of recorded field A. Likewise, alternate horizontal lines of even field A' constitute the even field horizontal lines of recorded field A. The remaining horizontal lines of odd field A' and even field A' are synthesized by interpolating between alternate horizontal lines. Odd field A' and even field A', interlaced together, comprise a synthesized full video frame, namely frame A'. Frame B' of FIG. 4 is reconstructed from recorded field B in the same manner. Frame A', frame B', etc. constitute a synthesized full-field video signal transmitted to a television, or the like. This playback video signal has a temporal sampling rate generally equal to that of the original incoming video signal (but has a vertical resolution equal to only half of the original incoming video signal).

Referring again to FIG. 3, the video tape head system 14 plays back the skip-field recorded video signal through a playback circuit 16 of the type well-known in the art. The output of the playback circuit 16 is applied to a switch 18 which alternately switches the playback signal to one of its two output terminals 18a, 18b at the horizontal line frequency $F_{horiz}$. The switch terminals 18a, 18b are connected, respectively, to horizontal line generators 20a, 20b. The output of the horizontal line generator 20b is applied to a field delay 22. A summing node 24 receives the outputs of the horizontal line generator 20a and of the field delay 22.

Figure 5:
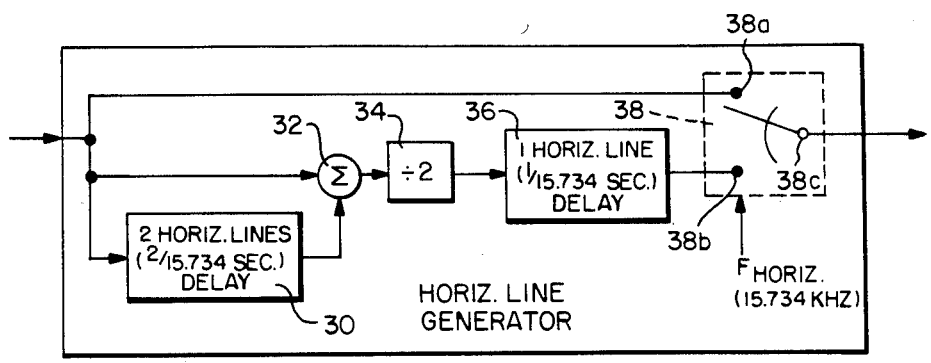
FIG. 5 is a block diagram of the horizontal line generator employed in the embodiment of FIG. 3.
Figure 6:
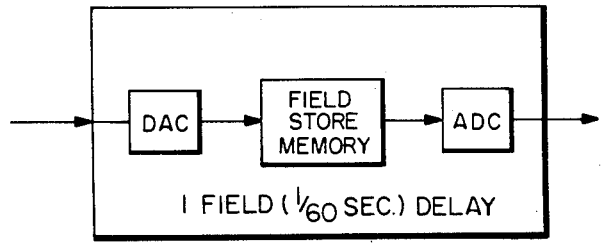
FIG. 6 is a simplified diagram of the field delay employed in the embodiments of FIGS. 1 and 3.

Each of the horizontal line generators 20a, 20b corresponds to the horizontal line generator of FIG. 5. It includes a delay 30 corresponding to the period of two horizontal lines (2/15,734 seconds for an NTSC system), a summing node 32, a half-power divider 34, another delay 36 equal to the time period of one horizontal video line (1/15,734 second for an NTSC system) and a switch 38 having two input terminals 38a, 38b and an output terminal 38c. The input to the horizontal line generator of FIG. 5 is applied directly to the switch terminal 38a, to the summing node 32 and to the input of the two-horizontal line delay 30. The output of the two-horizontal line delay 30 is applied to a second input of summing node 32. The half-power divider 34 reduces the output amplitude of the summing node 32 by a factor of two and applies it to the horizontal line delay 36, whose output, in turn, is applied to the other switch terminal 38b. The switch 38 alternately switches its output terminal 38c between its two input terminals 38a, 38b at the horizontal line frequency $F_{horiz}$.

During every other horizontal line of a given video frame, the output terminal 38c is connected to the input terminal 38a so that the horizontal line generator of FIG. 5 directly transmits the incoming horizontal video line received at its input to its output. During remaining horizontal lines of a given video frame, the output terminal 38c is connected to the other switch terminal 38b, so that the average of two alternate horizontal lines (i.e., either two odd horizontal lines or two even horizontal lines) is applied to the output terminal 38c. This provides the "interpolation" between alternate video lines mentioned above.

Referring again to FIG. 3, by the selective action of the switch 18, the horizontal line generator 20a transmits even field horizontal video lines to the summing node 24 while the horizontal line generator 20b transmits odd field horizontal video lines (or vice-versa) to the summing node 24.

Referring to FIG. 5, the field delay 22 may be of any type well-known in the art, such as, for an example, a digital field store memory which receives a video signal through a digital-to-analog converter and transmits a delayed video signal through an digital-to-analog converter. It should be apparent to those of skill in the art that all of the circuits illustrated in FIGS. 1, 3 and 5 may be implemented digitally, using equivalent digital means in place of the analog switches illustrated in the drawings.

The Technical Advance

By preserving, in a single recorded video field, information from both the odd and even fields of each incoming video frame, the invention performs skip-field recording while maintaining the temporal sampling rate of the original incoming video signal. This reduces the susceptibility of the skip-field playback image to high speed motion artifacts, a significant advantage.

While the invention has been described in detail with particular reference to preferred embodiments thereof, it is understood that other embodiments of the invention may be made within the spirit and scope of the invention.

What is claimed is:

1. A skip-field video recorder and playback device adapted to receive an incoming video signal comprising successive video frames of interlaceable pairs of odd and even video fields, said recorder comprising:
   means for generating a single composite video field comprising information from both the odd and even fields of a given one of said pairs;
   means for recording said composite video field, so as to preserve the temporal sampling rate of said incoming video signal while recording only one video field of information for each incoming video frame, and
   playback means for playing back and expanding said composite video field into a pair of synthesized interlaceable odd and even video fields.

2. A skip-field video recorder and playback device capable of recording on a magnetic medium portions of each video frame of an incoming video signal, said frame comprising interlacable even and odd fields, each of said fields comprising a plurality of horizontal video lines, said recorder comprising:

means for receiving said video frame;

means connected to said receiving means for constructing a composite video field wherein alternate horizontal video lines of said composite field correspond to alternate horizontal lines of said even field and remaining horizontal video lines of said composite field correspond to alternate horizontal lines of said odd field;

means connected to said constructing means for recording said composite video field on said magnetic medium, whereby only one video field is recorded for each video frame of said incoming video signal;

means for playing back said composite video field from said magnetic medium;

means for receiving said composite video field from said playback means and synthesizing therefrom a playback odd video field and a playback even video field, such that alternate horizontal lines of said playback odd field correspond to alternate horizontal lines of said composite field, and alternate horizontal lines of said playback even field correspond to remaining horizontal lines of said composite video field, whereby the temporal sampling rate of a playback video signal comprising a succession of playback odd and even fields is at least nearly equal to that of said incoming video signal.

3. The recorder of claim 2 wherein said synthesizing means includes means for interpolating between alternate horizontal video lines, so that remaining ones of said horizontal lines of said synthesized even and odd fields correspond to an average between a corresponding pair of the alternate horizontal lines thereof, whereby said composite video field is expanded to two synthesized video fields.

4. The recorder of claim 3 wherein said synthesizing means comprise:

first generating means adapted to receive, during a first video field interval, alternate horizontal lines of said composite video field from said playback means, and to generate average horizontal lines derived from pairs of said composite field alternate horizontal lines, and to transmit said alternate and average horizontal lines sequentially during said first video field interval;

second generating means adapted to receive, during said first video field interval, the remaining horizontal lines of said composite video field from said playback means, and to generate average horizontal lines derived from pairs of said composite field remaining lines, and to transmit, during a second video field interval, said remaining and average horizontal lines sequentially.

5. The recorder of claim 4 wherein said first generating means comprise:

an input node;

a two-horizontal-video-line delay having one terminal connected to said input node;

a summing node connected to said input node and to another terminal of said two-line delay;

a one-horizontal-video-line delay coupled through a divide-by-two means to said summing node;

an output node;

means for switching said output node between said input node and said one-line delay at a frequency $F_{vert}$.

6. The recorder of claim 5 wherein said second generating means is identical to said first generating means and comprises, in addition, a field delay connected to said output node, the output signals of said first generating means and of said field delay being combined to form a playback video signal.

7. The recorder of claim 2 wherein said means for constructing said composite video field comprise:

delay means for receiving one video field of said incoming video signal and transmitting it during receipt of the next video field;

switching means, characterized by two states, for transmitting said next video field to said recording means whenever said switching means is in a first state, and for transmitting said one video field from said delay means whenever said switching means is in a second state, said switching means being adapted to switch between said two states at a frequency $F_{horiz}$ corresponding to the horizontal line rate of said incoming video signal.

8. The recorder of claim 7 wherein said switching means is further adapted to skip transmitting to said recording means during alternate video field intervals.

9. The recorder of claim 8 wherein:

said delay means comprises a field store memory;

said switching means comprise first, second and third switches, said first switch being adapted to transmit alternate video fields of said incoming video signal to said second switch and to transmit remaining fields of said incoming video signal to said field store memory, said second switch being adapted to transmit said alternate video fields from said first switch to said third switch while in said first state and to transmit said remaining fields from said field store memory to said third switch while in said said second state, said second switch adapted to change between said first and second states at a frequency $F_{vert}$, said third switch adapted to transmit signals received from said second switch to said recording means only during alternate video field intervals characterized by said frequency $F_{vert}$.

10. The recorder of claim 7 wherein said first generating means comprise:

an input node;

a two-horizontal-video-line delay having one terminal connected to said input node;

a summing node connected to said input node and to another terminal of said two-line delay;

a one-horizontal-video-line delay coupled through a divide-by-two means to said summing node;

an output node;

means for switching said output node between said input node and said one-line delay at a frequency $F_{vert}$.

11. A skip-field video recorder and playback device capable of recording on a magnetic medium portions of each video frame of an incoming video signal, said frame comprising an even field and an odd field, each of said fields comprising a plurality of horizontal video lines, said recorder comprising:
- delay means for receiving one video field of said incoming video signal and for transmitting it during occurrence of the next video field;
- multiplexing means characterized by two states, for transmitting said next video field whenever said multiplexing means is in a first one of said two states and for transmitting said one video field from said delay means whenever said multiplexing means is in a second state, said multiplexing means being adapted to switch between said two states at a frequency $F_{horiz}$ corresponding to the horizontal line rate of said incoming video signal;
- means for recording the signal transmitted by said multiplexing means, wherein only a single video field is recorded for each video frame of the incoming video signal; and
- means for playing back signals recorded by said recording means.

12. The recorder of claim 11 wherein:
said delay means comprises a field store memory;
said multiplexing means comprises first, second and third switches,
- said first switch being adapted to transmit alternate video fields of said incoming video signal to said second switch and to transmit remaining fields of said incoming video signal to said field store memory,
- said second switch being adapted to transmit said alternate video fields from said first switch to said third switch while in said first state and to transmit said remaining fields from said field store memory to said third switch while in said second state, said second switch being adapted to change between said first and second states at a frequency $F_{vert}$,
- said third switch adapted to transmit signals received from said second switch to said recording means only during alternate video field intervals.

13. The recorder of claim 11 further comprising:
- first generating means adapted to receive, during a first video field interval, alternate horizontal lines of said composite video field from said playback means, and to generate average horizontal lines derived from pairs of said alternate horizontal lines, and to transmit said alternate and average horizontal lines sequentially;
- second generating means adapted to receive, during said first video field interval, the remaining horizontal lines of said composite video field from said playback means, and to generate average horizontal lines derived from pairs of said remaining horizontal lines, and to transmit, during a subsequent video field interval, said remaining and average horizontal lines sequentially.

14. In a skip-field video recorder and playback device, the improvement comprising a circuit adapted to construct, from each video frame of an incoming video signal, a composite video field of which alternate horizontal lines comprise alternate lines of the odd video field of said incoming frame, and of which the remaining horizontal video lines comprise alternate horizontal lines of the even field of said incoming frame, wherein said recorder records said composite video field, and further comprising playback means for playing back a signal recorded by said recorder.

15. The recorder of claim 14 wherein said playback means further comprises a playback circuit adapted to expand said composite field to a full video frame comprising an odd and an even video field, alternate lines of said playback odd field comprising alternate lines from said composite video field, the alternate lines of said playback even field comprising remaining lines of said composite field,
said improvement including means for interpolating between said alternate lines of said odd and even playback fields, whereby the remaining lines of said playback fields correspond to an average between pairs of alternate lines of said playback fields.

* * * * *